US011759067B2

United States Patent
Mesinovic

(10) Patent No.: US 11,759,067 B2
(45) Date of Patent: Sep. 19, 2023

(54) RELIEF VALVE AND A HOSE DEVICE FOR DUST COLLECTORS, A DUST COLLECTOR AND A METHOD FOR OPERATING A DUST COLLECTOR

(71) Applicant: HUSQVARNA AB, Huskvarna (SE)

(72) Inventor: Besim Mesinovic, Gothenburg (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/548,399

(22) Filed: Dec. 10, 2021

(65) Prior Publication Data

US 2022/0095863 A1 Mar. 31, 2022

Related U.S. Application Data

(63) Continuation of application No. 16/089,709, filed as application No. PCT/SE2016/050268 on Mar. 30, 2016, now Pat. No. 11,197,593.

(51) Int. Cl.
*A47L 9/00* (2006.01)
*A47L 9/14* (2006.01)
(Continued)

(52) U.S. Cl.
CPC ............... *A47L 9/0072* (2013.01); *A47L 9/14* (2013.01); *A47L 9/20* (2013.01); *A47L 9/248* (2013.01);
(Continued)

(58) Field of Classification Search
CPC ..... A47L 9/00; A47L 9/24; A47L 9/28; A47L 9/0072; A47L 9/14; A47L 9/20;
(Continued)

(56) References Cited

U.S. PATENT DOCUMENTS 3,961,921 A 6/1976 Heiman et al.
4,099,937 A 7/1978 Ufken et al.
(Continued)

FOREIGN PATENT DOCUMENTS

AU 199227293 A 5/1993
CN 2397978 Y 9/2000
(Continued)

OTHER PUBLICATIONS

Kärcher, A., "Vacuum Cleaner BV 5/1 BP", Retrieved from the Internet URL: https://www.kaercher.com/uk/professional/vacuums/dry-vacuum-cleaners/battery-operated-vacuum/bv-5-1-bp-13942180.html, on Nov. 10, 2015, 11 Pages.
(Continued)

*Primary Examiner* — Robert J Scruggs
(74) *Attorney, Agent, or Firm* — BURR & FORMAN LLP

(57) ABSTRACT

A hose device may include a flexible hose device body having a first end configured to be attached to a cyclone and a second end with a free opening. The hose device may also include a plurality of weights affixed between the first end and the second end. When subjected to suction forces from a vacuum of the cyclone, the second end may be sucked upwards such that the plurality of weights hingedly swing toward the first end and the hose device body is in a retracted configuration. When released from the suction forces of the cyclone, the plurality of weights hingedly swing away from the first end and the hose device body extends downwards into an extended configuration by the gravity forces acting upon the weights, in the absence of the suction forces, to expand a size of the free opening.

18 Claims, 7 Drawing Sheets

(51) Int. Cl.
  *A47L 9/24* (2006.01)
  *A47L 9/20* (2006.01)
  *A47L 9/28* (2006.01)
  *G05D 16/20* (2006.01)
  *B24B 55/06* (2006.01)

(52) U.S. Cl.
  CPC ........ *A47L 9/2821* (2013.01); *G05D 16/2033* (2013.01); *B24B 55/06* (2013.01)

(58) Field of Classification Search
  CPC ........ A47L 9/248; A47L 9/2821; F16K 31/06; F16K 17/04; F16K 31/08; F16K 31/0648; G05D 16/20; G05D 16/2033; B01D 46/04; B04C 5/22; B24B 55/06
  See application file for complete search history.

(56) References Cited

U.S. PATENT DOCUMENTS

| | | | |
|---|---|---|---|
| 4,316,514 A | 2/1982 | Jysky | |
| 5,062,870 A | 11/1991 | Dyson | |
| 5,066,315 A * | 11/1991 | Haberl | B04C 5/22 95/271 |
| 5,613,269 A | 3/1997 | Miwa | |
| 6,056,797 A | 5/2000 | Richard | |
| 6,231,649 B1 | 5/2001 | Dyson et al. | |
| 7,082,640 B2 | 8/2006 | McCutchen | |
| 7,300,482 B2 | 11/2007 | North | |
| 2011/0226130 A1 | 9/2011 | Kienzle et al. | |
| 2012/0000029 A1* | 1/2012 | Nicolaou | B04C 5/16 15/300.1 |
| 2012/0090640 A1 | 4/2012 | Rentschler et al. | |
| 2012/0137467 A1 | 6/2012 | Treitz | |
| 2012/0298145 A1 | 11/2012 | Rife | |
| 2013/0008468 A1 | 1/2013 | Bertram et al. | |
| 2013/0199137 A1 | 8/2013 | Hallgren et al. | |
| 2013/0319478 A1 | 12/2013 | Hensel et al. | |
| 2015/0182083 A1 | 7/2015 | Frank et al. | |
| 2016/0174803 A1 | 6/2016 | Vines | |

FOREIGN PATENT DOCUMENTS

| | | | |
|---|---|---|---|
| CN | 101484060 A | | 7/2009 |
| CN | 101489462 A | | 7/2009 |
| CN | 102196756 A | | 9/2011 |
| CN | 102421503 A | | 4/2012 |
| CN | 102712427 A | | 10/2012 |
| CN | 202912978 U | | 5/2013 |
| CN | 103384490 A | | 11/2013 |
| CN | 103987436 A | | 8/2014 |
| DE | 102013007183 A1 | | 10/2014 |
| EP | 0089114 A2 | | 9/1983 |
| EP | 1656872 A2 | | 5/2006 |
| EP | 1913857 A2 | | 4/2008 |
| EP | 2042240 A1 | | 4/2009 |
| JP | 2001198426 A | * | 7/2001 |
| JP | 2002028107 A | | 1/2002 |
| JP | 2007136288 A | | 6/2007 |
| JP | 2010110739 A | * | 5/2010 |
| SE | 521837 C2 | | 12/2003 |
| WO | 9835601 A1 | | 8/1998 |
| WO | 2004100752 A1 | | 11/2004 |
| WO | 2009041890 A2 | | 4/2009 |
| WO | 2014070063 A1 | | 5/2014 |

OTHER PUBLICATIONS

International Search Report and Written Opinion for International Application No. PCT/SE2016/050268 dated Jan. 19, 2017.

* cited by examiner

RELIEF VALVE AND A HOSE DEVICE FOR DUST COLLECTORS, A DUST COLLECTOR AND A METHOD FOR OPERATING A DUST COLLECTOR

CROSS-REFERENCE TO RELATED APPLICATIONS

This application is a continuation of U.S. patent application Ser. No. 16/089,709 filed on Sep. 28, 2018, now issued as U.S. Pat. No. 11,197,593, which is the national stage entry of International Application No. PCT/SE2016/050268 filed on Mar. 30, 2016, the entire contents of which are incorporated by reference in their entirety.

FIELD OF INVENTION

Example embodiments in a first aspect relates to a relief valve for portable, industrial dust collectors including actuating means for actuating the valve between a closed position and an open position, and which valve in its closed position is arranged to be exposed to vacuum pressure on one side of the valve and a higher pressure on the other side. It also relates to a dust collector provided with cleaner means and having a relief valve.

In a second aspect, example embodiments relate to a hose device for a cleaner having a bottom with a grid means and being intended for a dust collector.

And in a third aspect, example embodiments relate to methods for operating a dust collector having an inlet, a cleaner means, an outlet and vacuum generating means providing an air flow path between the inlet and the outlet across the cleaner means and further having a relief valve arranged in the air flow path between the cleaner means and the vacuum generating means, which method includes intermittently opening the relief valve.

BACKGROUND OF INVENTION

Dust collectors, in particular industrial, portable dust collectors are used i. a. together with grinding and/or polishing machines. In such applications the dust collector need to work non-stop for several hours to maintain high production efficiency on grinding work for professional users. They are usually equipped with a primary cleaner, usually a cyclone and a secondary cleaner, usually a filter of some kind. The primary cleaner, e.g. the cyclone typically retrieves 95% of all produced dust from the grinder. The secondary cleaner takes care of the rest 5%. Underneath both of those, there are plastic bags that collect the dust for disposal. Since the cyclone part gets filled with dust quickly, the dust amount check thereof is highly important. The operator of the grinding machine must know how much more dust can be collected before changing of the bag is required.

However, according to conventional technique, the operator needs to turn off the machine before checking the amount of dust inside the cyclone part. The reason is that vacuum holds the bag sucked to the bottom of the primary cyclone housing and keeps the dust sucked to the inside walls of the cyclone. Dust cannot fall down to the bag such that the operator could see the status of dust accumulation during operation. Bag change and/or dust amount control can only be done when there is no vacuum within the dust collector.

However, when the vacuum pressure is relieved, the dust can fall down from the cyclone into the plastic bag, and the bag can relief and be de-attached from the cyclone housing due to the absence of vacuum. The bag thus can be handled with and changed if needed.

Shutting off a large dust collector only to check the dust amount takes several minutes, and is an unwanted interruption for professional grinder operators. It is an unwanted downtime. It also adds manual work which takes time and focuses away from the grinding. However, not knowing how much dust there is in the cyclone during grinding is a problem. If too much dust has been accumulated at shutting off the dust collector also creates a problem. At shutting off the dust falls down into the bag, and the bag cannot swallow the amount of dust. The weight of the concrete dust that falls down into the bag, when no vacuum is present, may tear the bag apart, and spilled dust is the fact. Cleaning up the dust is unwanted downtime.

Another problem is that if a lot of dust has accumulated inside the cyclone, it will the gradually be sucked into the filter part, resulting in clogged filter and unwanted downtime for the operator.

A third problem, in particular for dust collectors which are equipped with pressurized air automatic blow cleaning system for filters, is that during vacuum, pressurized air has trouble to overwin the vacuum through the filter, resulting in poor automatic filter cleanings.

A still further problem is related to the emptying of the dust into the dust collecting bag beneath the cyclone. The bottom of the cyclone has a grid means, e.g. a net. If the net is too fine, the dust will have difficulty getting through the net an usually gets stuck inside the cyclone. If, on the other hand, the net is to sparse, there is a risk that the plastic dust collector bag will get sucked up through the net into the inside of the cyclone and prevent emptying by that.

A still further problem relates to shortcomings in prior art regarding the clean-blowing of the cleaner means when using an inlet valve for access of pressurized air to be supplied to the dust collector.

To cope with some of these problems it is known to provide a time controlled vacuum relief valve. Typically such a valve consists of a spring loaded valve facing atmospheric pressure on the outside and the vacuum on the inside. Such valves may be automatic or manually operated.

Automatic relief valves have either uncontrolled and too short opening time, or if better controlled, they are too big for neat installation on a portable, industrial dust collector.

Representative examples of such dust collectors are disclosed in WO 199803560, EP 1656872, U.S. Pat. Nos. 4,099,937, 4,316,514, 6,231,649, 5,062,870 7,300,482, US 20130008468, US 20130199137, US 20130319478, AU 19922729, JP 2007136288 and CN 202912978U.

US 20130319478 discloses a cyclone separator provided with an automatic vacuum relief valve. The valve is basically a pressure spring loaded plate that is kept in an upper, closed position by an electromagnet. When the magnet is shut off, the vacuum in the system will pull the plate downwards some millimetres. This will open a gap for atmospheric air to be sucked in and equalize the pressure on the two sides of the plate. This takes less than a second. The pressure spring will then push the plate back and close the valve.

Known manually operated vacuum relief valves have uncontrolled opening time, usually too short, less than a second. They open at certain under-pressure, set manually, by trials.

Both types of valves are mainly used as protection in systems against too strong vacuum. In the mentioned US 20130319478 the relief valve is used to pulse the atmospheric air through the filter as a cleaning method. However, the opening time is not sufficient for dust to get dumped from the cyclone into the bag. The opening time is also too short to blow the filter clean by a pressurized air automatic cleaning system.

SUMMARY OF SOME EXAMPLE EMBODIMENTS

An object of some example embodiments is to overcome the above described problems related to vacuum relief valves for dust collectors. More specifically the object is to improve the control of the dust dumping into the bag, to reduce the risk for filters to be clogged by dust and/or to improve the efficiency of automatic blow cleaning of filter with pressurized air.

A further object is to improve the cooperation between a cleaner and its related dust bag to facilitate emptying.

An object of a first aspect of some example embodiments is achieved in that a relief valve may include specific features as described herein. The relief valve may thus include retaining means for maintaining the valve in the open position.

By maintaining the valve in the open position it becomes possible to attain an opening time that is sufficient for dust to fall down into the bag and thereby reduce the risk for filter clogging. Maintaining the valve in the open position for a certain time period reduces the vacuum in the system during that period and thereby facilitates blow cleaning of the filter. The retaining means may be of any mechanical, fluid-mechanical or electric kind, e.g. a pneumatic device or an electromagnet. This relates also to the actuating means.

According to a preferred embodiment of the invented relief valve, the actuating means includes a movable member exposed on one side to the vacuum pressure and on an opposite side to said higher pressure when the valve is in the closed position.

According to a further preferred embodiment, the movable member constitutes a valve body sealingly cooperating with a valve housing According to a further preferred embodiment, the actuating means further includes a first force exerting means operable between an activated stage and a deactivated stage, which first force exerting means, when activated, exerts a force on the movable member counteracting the force resulting from said pressure difference across the movable member.

According to a further preferred embodiment, the first force exerting means includes an electromagnet.

According to a further preferred embodiment, the relief valve is provided with opening control means arranged to deactivate said first force exerting means at pre-determined time intervals for opening the valve.

According to a further preferred embodiment, the pre-determined time intervals have a length within the range of 100-300 seconds, such as within the range of 120-250 seconds. It is preferred with a length within 160 to 200 seconds, e.g. around 180 seconds.

According to a further preferred embodiment, the first force exerting means is located on the higher pressure side of the valve According to a further preferred embodiment, the actuating means further includes a second force exerting means exerting a force on the movable member acting in the same direction as the force from the first force exerting means.

According to a further preferred embodiment, the second force exerting means includes a mechanical spring means.

According to a further preferred embodiment, the mechanical spring means includes a helical pressure spring.

According to a further preferred embodiment, the second force exerting means is located on the vacuum pressure side of the valve.

According to a further preferred embodiment, the retaining means includes a third force exerting means, operable between an activated stage and a deactivated stage, which third force exerting means, when activated, exerts a force on the movable member acting in a direction opposite to the direction of the force from the first force exerting means.

Applying a further force for achieving maintenance of the open position of the relief valve is a reliable and efficient way for that purpose and provides good possibility to control the opening time. When the valve has opened and the third force exerting means is activated the valve is maintained open until deactivation of the third force exerting means.

According to a further preferred embodiment, the third force exerting means includes an electromagnet.

Using an electromagnet makes activation and deactivation of the force simple and precise.

According to a further preferred embodiment, the relief valve further includes control means arranged to deactivate the third force exerting means after a certain period of time after opening of the relief valve.

The deactivation of the third force thereby will occur automatically which leads to a more adequate opening time than if deactivation would have been initiated manually. The time should be sufficient long to allow dust in the cleaner means in the dust collector to fall down into dust bags and to allow sufficient blow cleaning of the cleaner means in the dust collector. On the other hand, unnecessarily long opening time should be avoided since it is non-productive time.

According to a further preferred embodiment, the control means includes timer means providing a predetermined length of the certain period of time.

The timer means may be connected to the initiation of the opening of the relief valve and thereby attain a precise opening time.

According to a further preferred embodiment, the certain period of time is within the range of 1-10 seconds, or preferably within the range of 1.5-6 seconds.

The certain time period should on one hand be sufficient long to allow time for the dust to fall down into the dust bag. On the other hand it should not be unnecessarily long in order to avoid that too much dust from the grinding machine is not taken care of. The specified range will in most cases represent an adequate balance between these two considerations. In particular a time range around 3 seconds, such as 2.5-3.5 seconds is optimal in this respect.

According to a further preferred embodiment, the timer means is adjustable for pre-setting the predetermined length.

The adequate opening time as defined above may vary in dependence of the kind of operation of the machine to which the dust collector is connected and may depend on the prevailing working condition. Allowing adjustment of the pre-setting time allows an adaption to these conditions.

According to a further preferred embodiment, the control means includes sensor means, sensing an operation parameter, whereby the certain period of time depends on the sensed parameter.

This is an alternative to have a pre-set period of time. The opening time according to this embodiment will be dependent on the conditions in the dust collector and provide an optimal adaption to these. The sensed parameter may e.g. be the pressure difference across the filter at clean blowing or related to measurement of the dust falling down into the dust bag. The sensed parameter may also be the position of an inlet valve for pressurized air for clean blowing.

According to a further preferred embodiment, the opening control means and the second control means are integrated into a general relief valve controller, e.g. of the programmable logic controller type.

One of the further objects of some example embodiments is solved in that a hose device includes specific features. The hose device may include a first end adapted for attaching the first end to the grid means and having a second end with a free opening, which hose device is flexible and is provided with weights attached thereto such that the hose device, when released from any suction forces, by gravity is allowed to extend downwards from the first end.

When the hose device is attached to the bottom of the cleaner in the dust collector and the collector is turned on, the vacuum sucks the dust bag, which then initially will push the hose device horizontally in the inward direction towards the centre and thereafter increasingly upwards against the underside of the bottom grid of the cleaner and suck the hose device against it. The hose will then act as a protection against that the dust bag is sucked through the grid means into the cyclone. When vacuum is released to empty the cleaner, the hose device returns to its natural shape hanging down with the opening at the second, lower end free due to the gravity of the weights. The dust in the cleaner, e.g. a cyclone or a filter, can thereby fall down through the grid means through the opening into the dust bag. With this hose device it will thus be possible to use a sufficiently sparse grid device to assure a proper flow of dust therethrough at emptying without the risk for sucking the bag into the cleaner when vacuum prevails. By grid means it is to be understood any kind of device having a grid function such as a net, sieve, strainer, grating or the like. Attaching the first end to the grid means may be a direct attachment thereto or via some intermediate device, e.g. a fastening device. Preferably the first end is adapted to be attached to the circumferential of the grid means.

According to a preferred embodiment of the invented hose device, the length of the hose device from the first end to the second end is in the range of 0.3-0.8 times the largest dimension of the first end, preferably 0.45-0.55 times.

Mostly the bottom of the cleaner is circular, which means that said dimension represents the diameter. Preferably, the hose device has a length enough to cover or almost cover the grid bottom but not unnecessarily long to disturb the functioning. The specified range normally is an adequate balance therebetween. It is optimal that the length is about half the largest dimension, e.g. diameter, and thereby is within the mentioned preferred range.

According to a further preferred embodiment, the hose device is tapering downwards when having the downwardly directed orientation.

The tapering facilitates a proper opening and closing of the grid means, and it is avoided that a lot of unnecessary excess hose material is gathered in the centre at closing position.

According to a further preferred embodiment, the first end is circular. This is an adaption to the conventional shape of a cleaner bottom, which normally is circular. In this case the shape of the hose device in the fall down orientation will be conical if it is tapering.

According to a further preferred embodiment, each weight has a length extending from adjacent the first end to adjacent the other end, which length is a plurality of times larger than any dimension thereof perpendicular to the length.

The thus oblong shape of the weights facilitates opening and closing of the hose device, since the weights will function as hinges. They are pressed inwardly and gradually upwardly by the dust bag when the vacuum is building up. At the release of the vacuum the rod- or band-like shape of the weights effectively pushes the hose device to its natural open shape.

According to a further preferred embodiment, each weight in a cross section perpendicular to its length has a width that is a plurality of times larger than its thickness, and the width of each weight extend in the circumferential direction of the hose device.

This means that each weight has a rectangular cross section, i.e. being like a band which lays against the hose. This shape facilitates to push the hose device up into the closed position.

According to a further preferred embodiment, the circumferential extension of the hose device at the middle between the first end and the second end is 2-6 times larger than the sum of the width extensions of the weights in that location, preferably 3-4 times larger.

The specified range, in particular the narrower one, has found to be optimal with regards to the need for sufficiently distributed weights and enough flexible material between these. Preferably the weights are evenly distributed around the circumferential, e.g. a circle. Preferably the number of weights is 3 to 8, most preferably 4 weights.

According to a further preferred embodiment, each weight has a pointed shape adjacent the second end of the hose device.

Thereby the weights may reach longer towards the centre at closing without the weights interfering with each other, which would cause trouble at closing. The hinge-function of the weights thereby will be optimized.

According to a further preferred embodiment, the hose material is elastic.

Since the hose device at opening and closing is expanding and decreasing, respectively, it is necessary that it has the ability to adapt to this. This is basically attained in that the hose device is flexible allowing it to wrinkle. If the hose material in addition is elastic this will increase the ability to adaption, and wrinkling will be required to a lesser degree.

An object of some example embodiments is further achieved in that a cleaner for a portable, industrial dust collector, which cleaner includes a housing with a bottom, which bottom includes a grid means arranged to allow dust particles to pass therethrough, includes a hose, which hose device is attached to the grid means.

The cleaner may be a cyclone, a filter or any other kind of dust separation device. When used in a dust collector having more than one cleaner, e.g. a cyclone and a filter, a hose device as invented may be attached both to the cyclone and the filter. "Attached to the grid means" is to be understood as either directly attached thereto or attached via some device, e.g. a fastening device. Preferably the hose device is attached to the circumferential of the grid means.

According to a preferred embodiment, the cleaner is a cyclone.

The object of some example embodiments is further achieved in that a dust collector with cleaner means is provided with a relief valve according to some example embodiments, in particular according to any of the example embodiments thereof and/or provided with a cleaner, in particular according to any of the example embodiments thereof.

The object of some example embodiments is further achieved by improving a dust collector with cleaner means, a relief valve and an inlet valve connected to a source of pressurized air, through which inlet valve the source of pressurized air is connectable to an air flow path formed between the cleaner means and the relief valve at operation of the dust collector. The improvement is that the dust collector includes the feature that actuation of the inlet valve is synchronized with actuation of the relief valve.

By synchronizing the actuations of these valves it is attained that the change in pressure conditions within the dust collector at opening of the relief valve, which change is an increase from vacuum towards atmospheric pressure, are taken advantage of such that the changed pressure conditions facilitate for the pressurized air incoming through the inlet valve to perform an effective clean-blowing and at a proper timing.

The relief valve may be of a kind according to the first aspect of some example embodiments but may as well be of any other appropriate type, which not necessarily is provided with retaining means. The relief valve may e.g. be pneumatically controlled.

According to an example embodiment of the dust collector with synchronized valves, the relief valve is provided according to some example embodiments.

According to a further example embodiment, the dust collector includes a central controller governing the actuation of the inlet valve and the relief valve and the synchronization.

By such a central controller, all governing instructions are easy to match a desired timing pattern for the valves, and the central controller provides safety that the timing pattern is adapted to that. Risk for mistakes when the governing is controlled by separate controllers or when parts of the actuation are manually performed is eliminated.

According to a further preferred embodiment, the central controller includes a programmable logic controller.

With such a programmable logic controller, the timing in the actuation sequence is easy to pre-set and adapt to the specific conditions. It also provides a high degree of accuracy allowing optimization of the clean-blowing.

According to a further preferred embodiment, the inlet valve is governed to be open only when the relief valve is open.

According to a further preferred embodiment, the inlet valve is governed to open only after opening of the relief valve and governed to close before closing of the relief valve.

This aspect assures that the change in pressure conditions obtained by the actuation of the relief valve contributes to an effective clean-blowing.

According to a further preferred embodiment, the relief valve is governed to be kept open during a time period that is a plurality of times longer than the opening time of the inlet valve.

The opening time is to be understood as the time duration during which the inlet valve is open. The specified relation is advantageous in order to give enough time for the changes in the pressure conditions to be sufficient for these to adapt to an effective clean-blowing and a reliable return to normal operation conditions of the dust collector. The relation is to be chosen in consideration of providing sufficient time for the clean-blowing on one hand, and sufficient time for adaption of the changing pressure conditions on the other hand. It is also desirable to avoid unnecessarily long opening time for the relief valve. Balancing these consideration results in that in most cases it is appropriate if the time period is 5-20 times longer than the opening time of the inlet valve. A relation of 8-12 times, e.g. 10 times will be optimal in many cases.

According to a further preferred embodiment, the relief valve is governed to open at predetermined intervals.

Thereby it can be assured that clean-blowing will occur at a frequency necessary for a proper performance of the dust collector. Manually governing this would entail the risk of either reducing the efficiency of the dust collector operation or of clean-blowing too often, reducing the operation time. Preferably, the time intervals are equal in length. Mostly a time interval of 100-300 seconds is appropriate, in particular a time interval of 120-250 seconds, such as a time interval of 160-200 seconds, e.g. 180 seconds.

According to a further preferred embodiment, the relief valve after each opening thereof is governed to be kept open for a pre-set time.

This is an important aspect of the synchronization. Adequate is normally a pre-set time of 2-10 seconds, such as 2-6 seconds, in particular within the range of 2.5-3.5 seconds, e. g. 3 seconds. This provides in most cases sufficient time for the clean-blowing and the necessary pressure adaption. The time is on the other hand not unnecessarily long.

According to a further preferred embodiment, the inlet valve is governed to open after a certain time delay after opening of the relief valve.

A time delay is advantageous in order to build up a pressure increase in the dust collector that is sufficient for a proper clean-blowing The time delay is preferably is in the range of 0.5-2.0 seconds, in particular within the range of 0.9-1.1 seconds, e.g. 1.0 second. With the lower limit of the preferred range for the time delay, in particular the narrower one, the pressure conditions within the dust collector will grow from vacuum to about atmospheric pressure or at least sufficiently close to that such that optimal or almost optimal conditions for the clean-blowing is attained.

According to a further preferred embodiment, the inlet valve after each opening thereof is governed to close within a pre-determined period of time.

Also the opening time for the inlet valve is an important parameter to govern. The period of time is preferably within the range of 0.1-1.0 seconds, such as within the range of 0.2-0.7 seconds, most preferably within the range of 0.25-0.35 seconds. This in most cases is sufficient long time and avoids undue long opening time.

According to a further preferred embodiment, actuation of the relief valve and the inlet valve is governed to follow a predetermined time pattern such that the relief valve is opened at intervals of about 180 seconds and kept open for about 3 seconds, and the inlet valve is opened about 1 second after opening of the relief valve and is kept open for about 0.3 seconds, whereby about means an interval between −30% and +30% of the respective specified time.

This time pattern is optimal for most application and represents an adequate tuning of the different time spans in relation to each other. The pattern balances the need for sufficient time for the steps in the clean-blowing with the need to keep the unproductive time as short as possible. Preferably the range is within −10% to +10%.

According to a preferred embodiment of the invented dust collector, it is portable.

According to a further preferred embodiment, the dust collector is an industrial dust collector.

According to a further preferred embodiment, the cleaner means includes a primary cleaner and a secondary cleaner.

According to a further preferred embodiment, the primary cleaner includes a cyclone.

According to a further preferred embodiment, the secondary cleaner includes a cyclone.

According to a further preferred embodiment, the second cleaner includes a filter.

According to a further preferred embodiment, the cleaner means includes a tertiary cleaner, which includes a filter.

It is to be understood that when the cleaner means includes a cyclone as well as a filter they may be integrated such that a small cyclone-movement is induced in the bottom of a filter unit. It is also possible to arrange a cyclone cleaner around a filter, e.g. as disclosed in WO2014070063 or arrange a first cyclone around a second cyclone.

According to a further preferred embodiment, the dust collector includes a vacuum generating means providing an air flow path from an inlet of the dust collector to an outlet thereof, which vacuum generating means is arranged downstream the cleaner means and wherein the relief valve is located in the air flow path between the cleaner means and the vacuum generating means.

According to a further preferred embodiment, the dust collector is provided with at least one dust collecting bag.

According to a further preferred embodiment, at least one of the at least one dust collecting bag is/are arranged to be visible from the outside of the dust collector.

Thereby it will be possible to see after each dumping of dust if the dust bag is filled or is capable of receiving at least one further dumping of dust. Thereby overloading as well as unnecessary exchange of a dust bag can be avoided.

According to a further preferred embodiment, at least one of the at least one dust collecting bag is/are detachable from the dust collector during operation.

The object of some example embodiments is further achieved in that a grinding and/or polishing machine is provided with a dust collector according to some example embodiments.

The object of some example embodiments is according to the third aspect of the of some example embodiments is achieved in that a method includes specific steps provided herein. The method thus includes applying an external force that maintains the relief valve opened for a certain period of time.

The object of the some example embodiments is further achieved in that a method includes specific steps as provided herein. Thus the method includes governing the actuations of the relief valve and the inlet valve such that they are synchronized with each other.

According to preferred embodiments, the methods are performed with a dust collector according to some example embodiments, in particular according to any of the preferred embodiments thereof. The features defining the dust collector and the preferred embodiments thereof thereby imply method steps directly derivable from the features of the dust collector and its preferred embodiments.

The invented dust collector, the invented grinding and/or polishing machine and the invented method as well as the preferred embodiments of these have similar advantages as those of the invented relief valve and the invented hose device, respectively and the preferred embodiments thereof.

The above described preferred embodiments are set out in the dependent claims. It is to be understood that further preferred embodiments may be constituted by any possible combination of features of the described preferred embodiments and by any possible combination of features in these with features described in the description of examples below.

DESCRIPTION OF EXAMPLES

Figure 1:
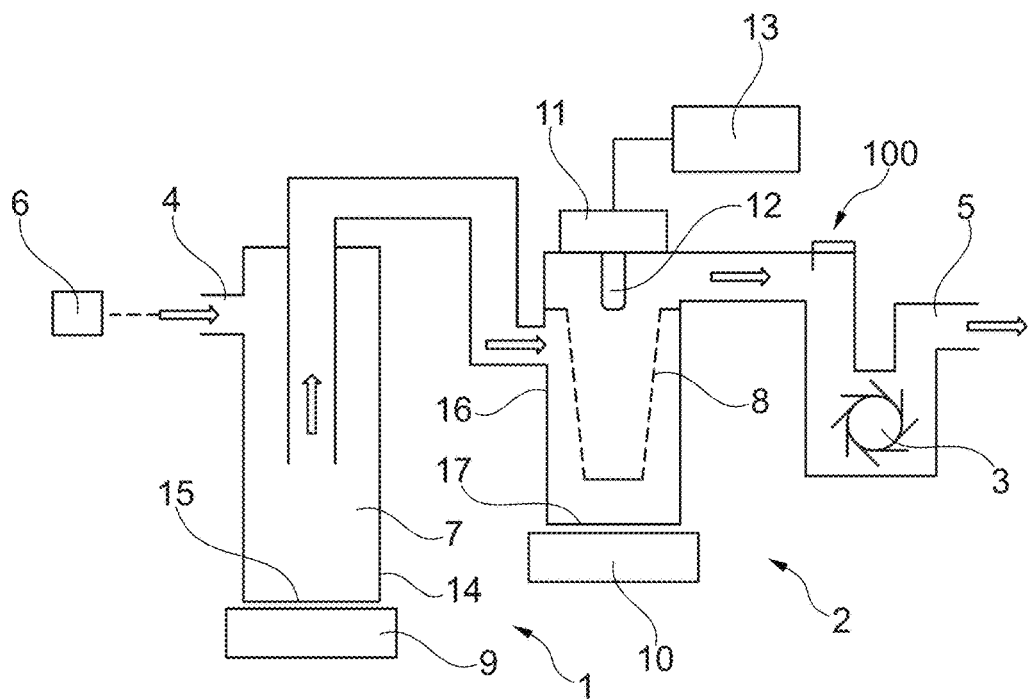
FIG. 1 is a schematic illustration of an exemplary dust collector according to some example embodiments with the relief valve in closed position.

FIG. 1 is a schematic representation of a dust collector according to an example embodiment. The dust collector has an inlet 4 and an outlet 5 and forms a fluid path for air through the dust collector. The inlet 4 is connected to a grinding machine 6. A motor driven fan acts as a vacuum generating means 3 thereby establishing an air flow through the dust collector from the inlet 4 to the outlet 5 as indicated by the arrows. The dust collector has a primary cleaner 1 and a secondary cleaner 2. The primary cleaner 1 includes a cyclone 7. The secondary cleaner includes a filter 8.

At the bottom of the cyclone 7 there is a dust bag 9 that may be made of plastic. The dust bag 9 is arranged to collect accumulated dust from the cyclone 7. A similar dust bag 10 is mounted beneath the filter 8. The bottom 15 of the cyclone housing 14 and the bottom 17 of the filter housing 16 are configured as grids or nets allowing dust to path therethrough.

Between the secondary cleaner 2 and the vacuum generating means 3 there is a relief valve 100 that in this figure is shown in the closed position. When the relief valve is in the open position (see FIG. 2) it communicates the flow path to the surrounding air which normally is at atmospheric pressure.

On the downstream side of the filter 8 there is an inlet valve 12 for pressurized air from an air tank 11, receiving pressurized air from a compressor 13.

FIG. 1 illustrates the dust collector at normal operation. At normal operation the vacuum generator 3 creates a vacuum in the flow path in the dust collector, by which air with dust particles is forced to flow therethrough. The primary cleaner 1, the cyclone 7, separates most of the dust particles, typically 95% or more. The separated dust is gathered in the cyclone on the walls of the cyclone housing 14 as well as on the bottom 15 thereof. Due to the vacuum prevailing in the cyclone 7 the dust bag will be held sucked up against the grid bottom 15. The remaining dust particles are separated by the filter 8 in the secondary cleaner 2. The dust particles gather on the upstream side of the filter 8 and on the bottom 17 of the filter housing 16. Also the dust bag 10 will be held sucked up against the grid bottom 17.

After the secondary cleaner 2, air that is substantially free from dust flows to the outlet 5 via the vacuum generating means 3.

Figure 2:
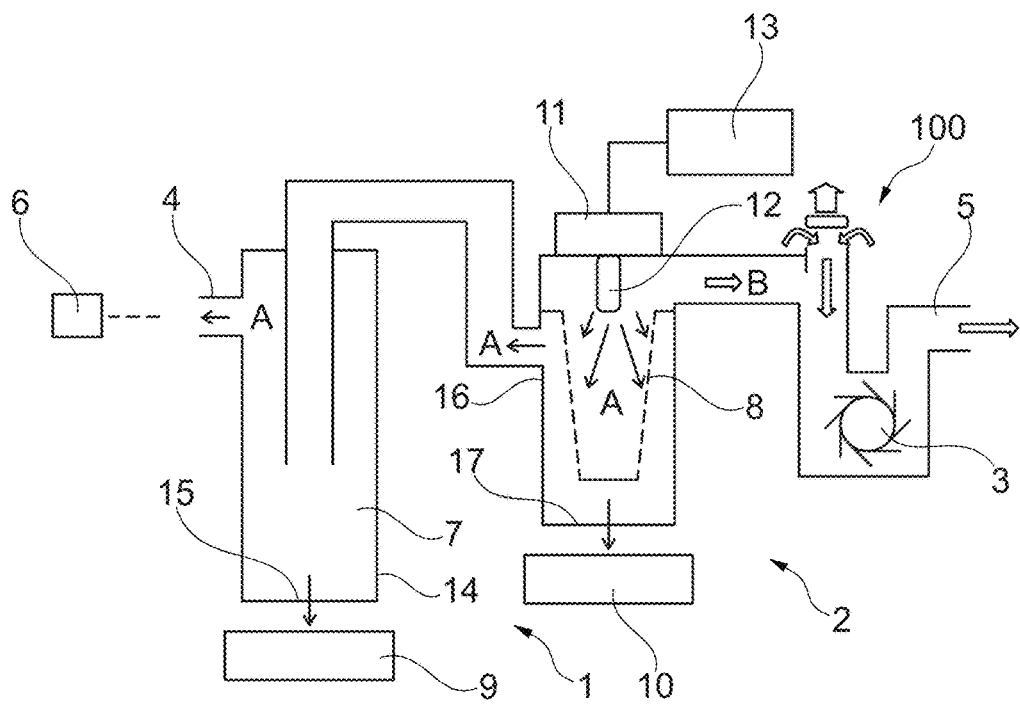
FIG. 2 is an illustration corresponding to that of FIG. 2 with the relief valve in open position.

FIG. 2 represents the same dust collector as FIG. 1 but illustrates it in a deactivated mode of operation. This mode of operation is attained by opening the relief valve 100 as illustrated in the figure. Running of the vacuum generating means 3 is continued without problem also during the deactivated mode of operation, since the major part of the air that flows in through the relief valve 100 flows in direction of the vacuum generating means 3.

The open relief valve 100 eliminates the vacuum within the dust collector. Thereby the dust bags 9, 10 no longer will be sucked up against the respective grid bottom 15, 17. The dust in the cyclone 7 thereby is allowed to fall down into the dust bag 9 through the grid bottom 15, and the dust in the filter housing 16 falls down to its dust bag 10.

When the dust bags 9, 10 are not sucked against the respective grid bottom 15, 17 but are in these fallen down positions they are visible from the outside of the dust collector. An operator thereby will be able to see how much dust is contained in the respective dust bag 9,10 and decide whether it is necessary to exchange a dust bag with an empty one or if it still has capacity to house more dust so that normal operation can continue until later.

After a time period, sufficient long for the dust in the cleaners 1, 2 to fall down into the dust bags 9, 10, the relief valve 100 is shut. Thereby the vacuum pressure within the dust collector is restored and the normal operation mode starts again.

During the period when the relief valve 100 is open cleaning of the filter 8 and the cyclone 7 is possible. This is attained by blowing pressurized air into the dust collector from an air tank 11 through an inlet valve 12. The pressurized air is injected into the dust collector at a location downstream the filter 8 but upstream the relief valve 100. The pressurized air creates a flow through the cleaners 1, 2 in the opposite direction than at normal operation, i.e. as indicated by the arrows A. The reverse flow through the filter 8 cleans it from dust, which falls down into the dust bag 10. The pressurized air also cleans the cyclone 7.

A major fraction of the pressurized air flows towards the vacuum generating means 3 as indicated by the arrow B.

Actuation of the relief valve 100 to the open position may be performed automatically at certain time intervals or in response to sensed operation parameters in the dust collector. Alternatively, opening of the relief valve 100 may be done manually. The relief valve is maintained open a certain period of time that is sufficient to effectively dump the dust into the dust bags 9, 10 and to clean the filter 8 and the cyclone 7. The function of an example of the relief valve 100 will be explained in more detail below with reference to FIGS. 3 and 4.

Figure 3:
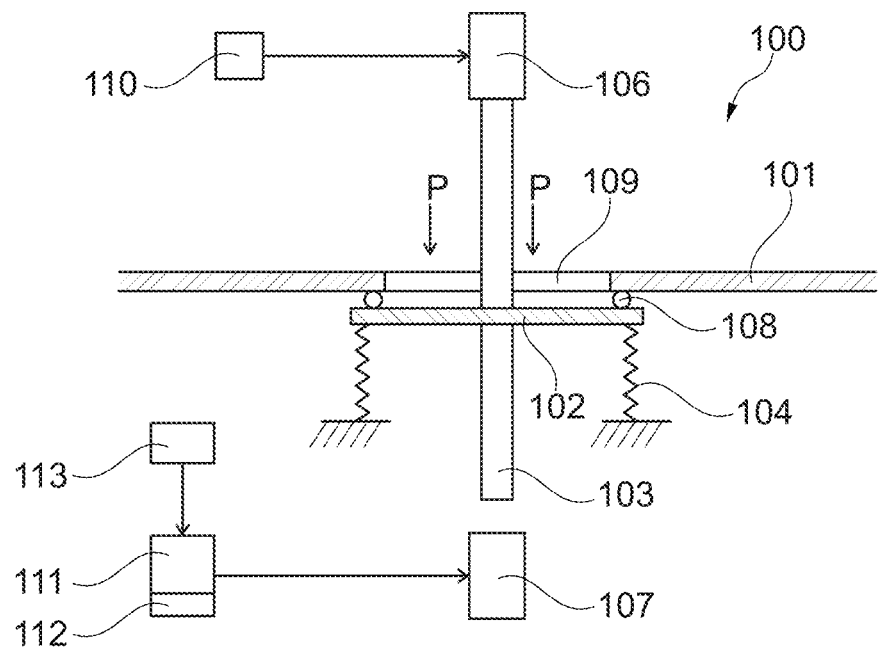
FIG. 3 is an illustration of the principle of the relief valve as open.
Figure 4:
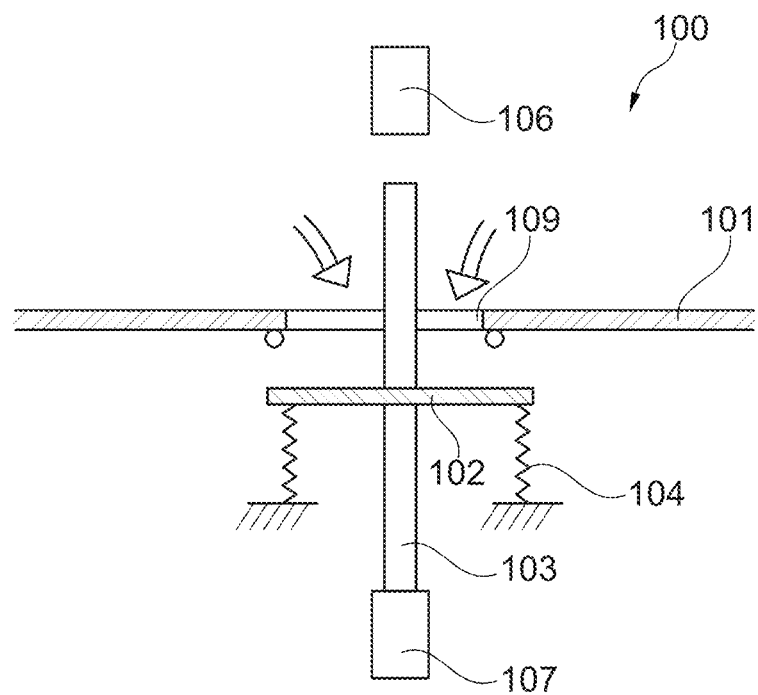
FIG. 4 illustrates the principle of the relief valve as closed.

FIGS. 3 and 4 illustrates the working principle of the relief valve 100 in a schematic example depicted merely for illustrative purpose. FIG. 3 illustrates the relief valve 100 in its closed position when the machine performs its operation. In this position an opening 109 in the valve housing 101, which may be the wall of the duct where the valve is mounted, is covered by a plate-shaped movable member 102 acting as a valve body. A sealing 108 between the valve body and the valve housing 101 seals the upper side of the relief valve from its inner side. At the upper side prevails atmospheric pressure and on the inner side, i. e. within the duct there is vacuum.

A valve stem 103, which is magnetic at least at its ends, carries the movable member 102. An electromagnet 106 holds the valve stem 103 in the shown position and represents a first force exerting means. In addition a pressure spring 104 urges the movable member 102 towards the valve housing 101 and represents a second force exerting means acting in the same direction as the electromagnet 106. The atmospheric pressure P outside the relief valve urges the movable member 102 downwards in the direction of opening the valve. This is prevented by the force of the electromagnet 106.

A short distance below the lower end of the valve stem 103 in this position there is a further electromagnet 107.

At certain intervals the relief valve 100 is to be opened for dust dumping and clean blowing. This may be initiated manually or by means of an opening control means 110. This is performed by breaking the current to the electromagnet 106, so that its force in the upward direction becomes deactivated. The pressure difference between the atmospheric pressure P and the vacuum inside thereby presses the movable member 102 downwards against the action of the pressure spring 104, which is too weak to alone withstand the force from the pressure difference. The relief valve thereby reaches it open position.

The open position is illustrated in FIG. 4. In that position, the lower end of the valve stem 103 has reached the electromagnet 107. The electromagnet 107 is in activated stage when the valve stem 103 reaches it and therefor attracts the valve stem 103. The electromagnet 107 acts as a third force exerting means, and the force dominates over the force from the pressure spring 104 so that the relief valve 100 is maintained open as long as the electromagnet 107 is activated.

After a certain period of time, the electromagnet 107 is deactivated. The pressure spring 104 thereby presses the movable member 102 up against the valve housing 101. The spring force is not sufficient to alone withstand the pressure difference. However, with the movement of the movable member 102 also the valve stem 103 moves up towards the upper electromagnet 106, which in this moment is brought into activated state again. The electromagnet 106 will catch the end of the valve stem 103 and maintain the relief valve 100 closed.

The activation time of the lower electromagnet should be sufficient to allow emptying of the dust in the cleaner down in the dust bag and to give sufficient time for clean blowing. The activation time is controlled by a second control means 111. This may be governed from a timer 112 or from a sensor 113.

The opening control means 110 and the second control means may constitute parts of a common general relief valve controller arranged as a programmable logic controller.

Figure 5:
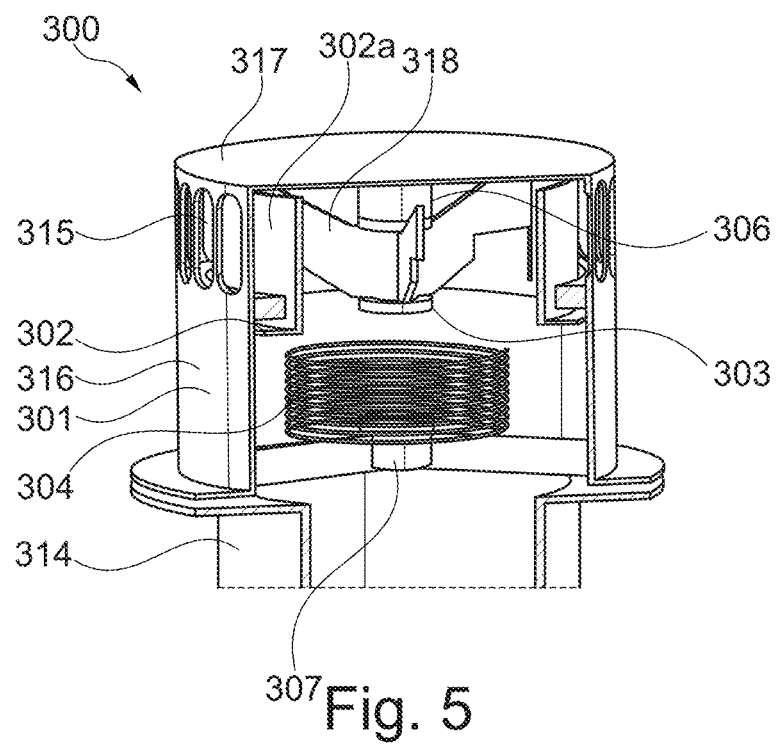
FIG. 5 is a perspective view of an exemplary relief valve as open.
Figure 6:
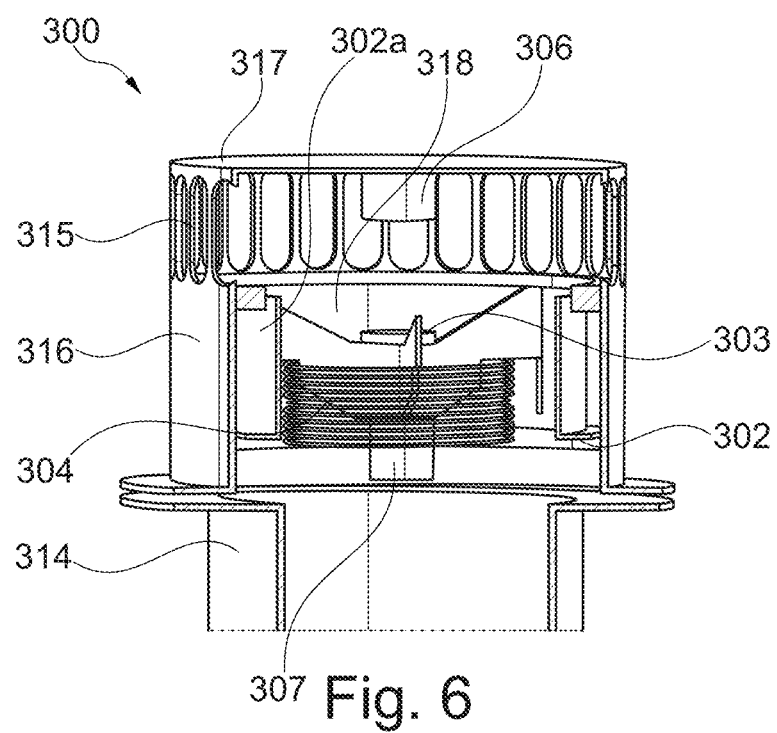
FIG. 6 is the relief valve of FIG. 5 as closed.

FIGS. 5 and 6 illustrate an example of a relief valve 300 according to some example embodiments in the closed and open position, respectively. The relief valve 300 is arranged at the top of a duct 314 communicating with the interior of the dust collector at a location corresponding to that illustrated in FIG. 1. Communication with the ambient air is accomplished by the inlets 315 spaced around the cylindrical part 316 of the valve housing 301.

In the closed position of FIG. 5 the atmospheric air is restricted to reach only the space radially outside the cylindrical valve member 302a and axially above a movable member 302. The movable member 302 is an annular plate extending radially outwards from the bottom end of the cylindrical valve body 302a. Inside the walls formed by the movable member 302 and the valve body 302a there is vacuum.

The valve stem 303 is by means of consoles 318 rigidly connected to the valve body 302a. A pressure spring 304 is arranged concentric with the valve stem 303 Further down, the second electromagnet 307 is located a short distance below the valve stem 303.

When the upper electromagnet 306 is deactivated the pressure difference across the annular movable member 302 presses it downwards. The valve body 302a attached thereto thus also moves downwards.

In FIG. 6, the relief valve is in its open position, in which the valve body 302a has opened up for ambient air for flowing into the interior of the valve housing and reach down to the dust collector via the duct 314. At this state the valve stem 303 is captured by the activated lower electromagnet 307, and the consoles 318 of the valve stem are urged against the compression spring 304.

When the lower electromagnet is deactivated the pressure spring 304 pushes the valve stem 303 upwards until it is captured by the upper electromagnet 306 again and thereby returns to its closed position.

Figure 7:
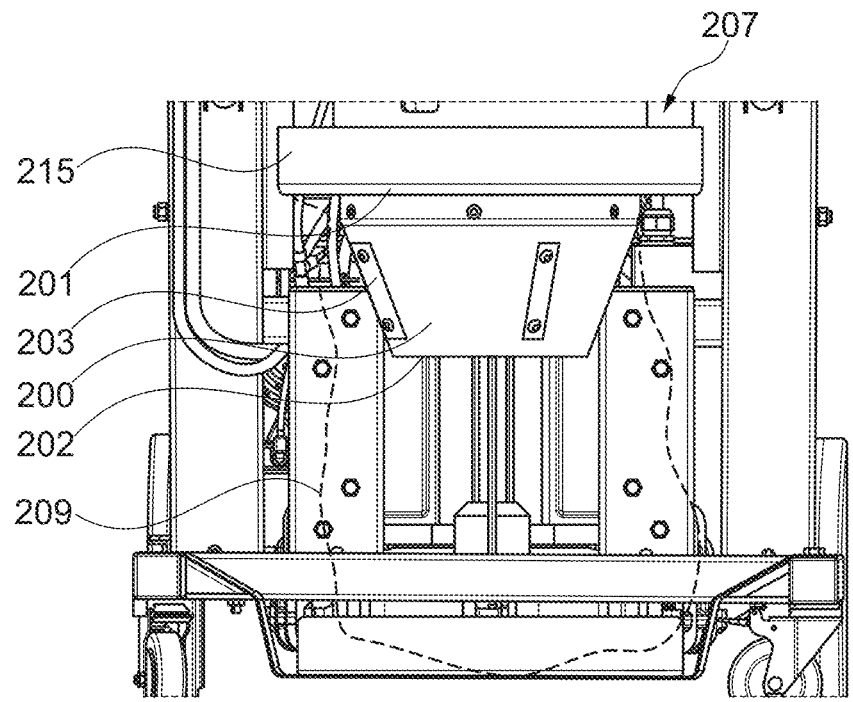
FIG. 7 is a side view partly in section of an exemplary hose device according some example embodiments in a first position.

FIG. 7 is a side view of a hose device 200 according to an example embodiment. The hose device 200 is mounted at the bottom 215 of a cyclone 207 in a portable, industrial dust collector. The hose device 200 in this example has a conical shape in the open position when no vacuum prevails. It hangs down from a first end 201 attached to the grid means (not visible) at the bottom of the cyclone 207. The lower, second end 202 of the hose device 200 is open.

The material of the hose device 200 is flexible and elastic. The material preferably comprises an elastomer. Preferably, the material comprises rubber, such as natural rubber. Preferably, the material comprises a blend of natural rubber and Styrene-Butadiene Rubber (SBR). The dust bag 209 hangs down from the cyclone 207 to which it is attached and is made of plastic.

On the external side of the hose device are four weights 203 attached evenly distributed around the same. Each weight 203 has a flat oblong shape with the flat side abutting the hose device. Each weight 203 extends a short distance from the upper, first end 201 to a short distance from the lower, second end 202. At the lower end each weight has a pointed shape 204.

The figure illustrates the hose device 200 and the dust bag 209 in the state when no vacuum prevails. Thereby the weights 203 hold the hose device 200 directed downwards so that an opening is formed at its bottom. In this position dust that has been accumulated on the bottom grid of the cyclone 207 will fall down into the dust bag 209. When emptying is finished, the machine in which the cyclone works is ready to operate again and the development of vacuum inside the cyclone 207 is initiated, e. g, by closing a relief valve.

Figure 8:
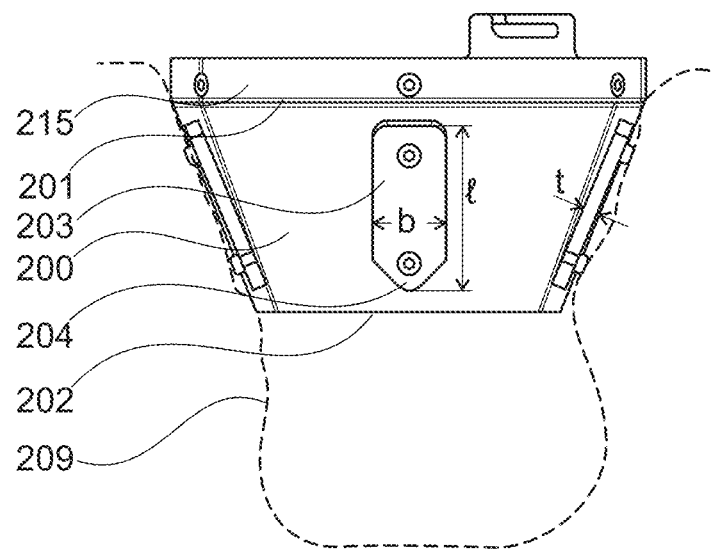
FIG. 8 is a view similar to that of FIG. 7 illustrating the hose device in a second position.

FIG. 8 illustrates the hose device 200 and the dust bag 209 at the beginning when the vacuum starts to act. From the position in FIG. 7, the dust bag 209 will be sucked inwards against the hose device 200.

Figure 9:
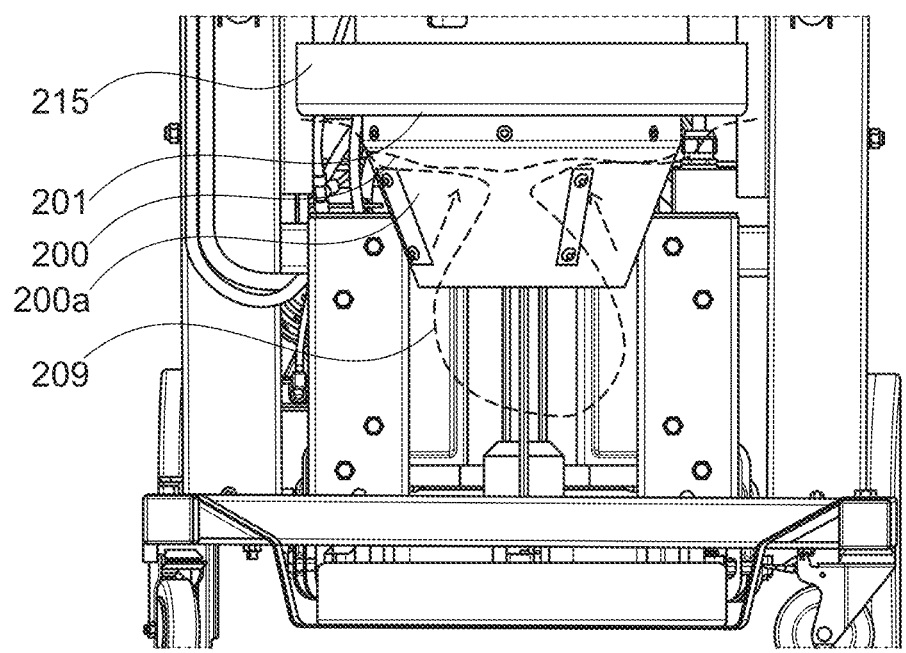
FIG. 9 is a view similar to that of FIG. 7 illustrating the hose device in a third position.

By the force from the vacuum, the dust bag 209 will push the hose device 200 inwards and upwards, whereby each weight 203 swings like a hinge around its upper end. At the end the hose device 200 and the dust bag 209 reaches the position illustrated in FIG. 9, where the hose device 200 by the vacuum is sucked upwards against the underside of the bottom 215 of the cyclone 207 as indicated by the arrows. For illustrative purpose the hose device in this figure is depicted also in its hanging down position, in this figure indicated at 200a.

Although the hose device 200 is flexible and elastic, it is more rigid than the dust bag 209. Therefore, and because of the weights, the hose device 200 will not be sucked up through the grid means at the bottom 215 of the cyclone 207. The hose device 200 in this position will prevent the dust bag 209 from being sucked up through the grid means. Part of the dust bag 209 will hang down below the hose device 200 as illustrated or be sucked up against it if there remains some air leakage across the hose device 200.

When it is time for dumping dust into the dust bag 209, the vacuum in the cyclone is released by the release valve. In the absence of vacuum, the weights 203 will by gravity swing down so that the hose device 200 reaches it down-directed conical position and the dust will fall through the grid device and through the opening at the bottom of the hose device into the dust bag.

It is to be appreciated that a hose device 200 according to some example embodiments can be mounted to any one of the primary 1 and secondary 2 cleaners in FIGS. 1 and 2. Preferably, hose devices 200 are mounted to both the primary 1 and the secondary 2 cleaner, more specifically, hose devices 200 are suitably mounted to both the cyclone housing 14 and the filter housing 16.

Figure 10:
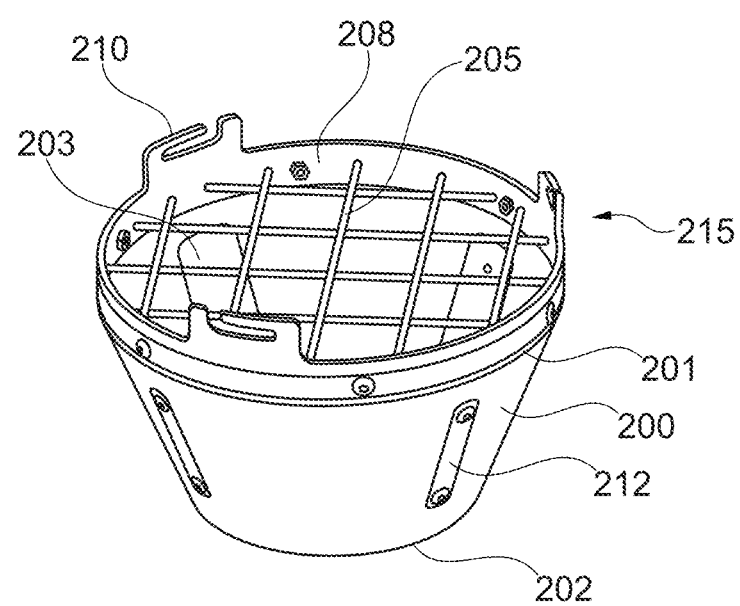
FIG. 10 is a perspective view of the hose device of FIG. 7.

FIG. 10 illustrates the hose device 200 in a perspective view from above as attached to the bottom 215 of a cleaner. The bottom 215 consists of a rim 208 and a grid 205 attached to the rim 208. By bayonet-fasteners 210 on the rim 208, the bottom 215 is easily detachable from the cylindrical wall (not shown) of the cleaner. Each of the four weights 203 are attached to the inside of the hose device 200 and secured on the outside by a clamp 212.

Figure 11:
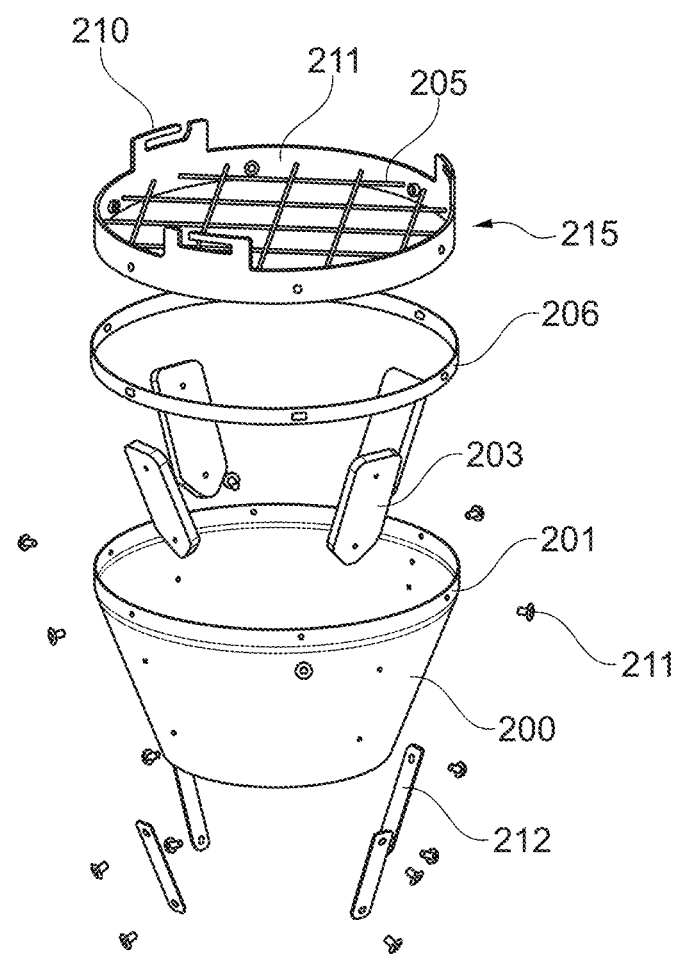
FIG. 11 is an explosive view of the hose device of FIG. 10

FIG. 11 shows the hose device 200 of FIG. 10 in an explosive view. The upper end 201 of the hose device 200 is attachable to the circumferential of the grid 205 by means of a fastening ring 206 and screws 211.

Figure 12:
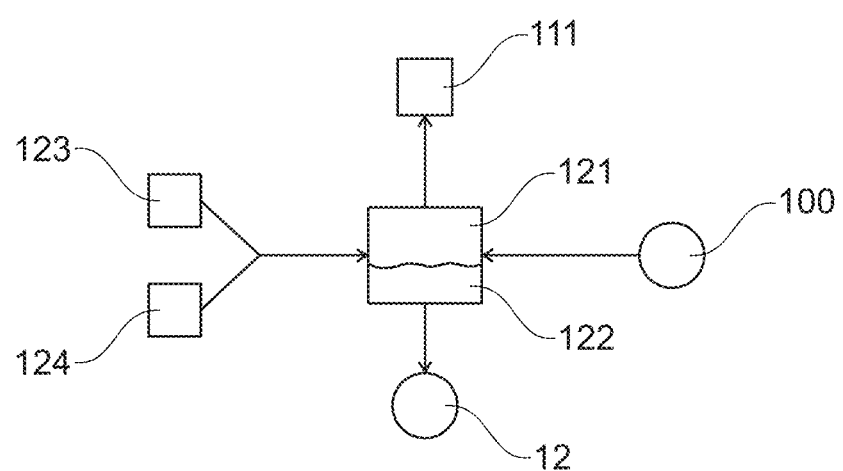
FIG. 12 is a block diagram illustrating actuation of an inlet valve for pressurized air.

FIG. 12 illustrates the actuation of the inlet valve 12 (see also FIG. 2) for pressurized air used for clean blowing the filter 8. Opening and closing of the inlet valve 12 is controlled by a clean-blowing control unit 121 initiating opening and closing of the inlet valve 12.

The clean-blowing control unit 121 may be arranged to receive signals from the relief valve 100 when the latter opens, which signals may initiate immediate opening of the inlet valve 12. Alternatively the clean-blowing unit may include a second timer means 122, which is arranged to delay opening of the inlet valve 12 a pre-determined period. The length of this period may be adjustable.

The second timer means 122 may also be arranged to initiate closing of the inlet valve 12 after it has been open a certain time. Also the duration of the opening time may be adjustable.

As an alternative or as a complement to timer means, the clean-blowing control unit may act in response to pressure sensors. In one alternative a pressure sensor 123 containing two pressure sensing spots arranged on either side of the filter 8 senses the pressure drop across the filter 8. At beginning of the clean blowing the pressure drop is relatively high due to the gathering of dust on and within the filter 8. As the dust is blown away from the filter 8, the pressure drop will gradually decrease. The decreasing pressure drop is compared with the initial pressure drop. When the pressure drop has passed below a certain threshold closing of the relief valve is initiated.

In another alternative the pressure in the duct between the inlet valve 12 and the relief valve 100 is sensed by another sensor 124 as an indicator for initiating the closing of the inlet valve 12.

In order to assure that the inlet valve 12 closes before the relief valve 100 the second control means 111 of the relief valve (see FIG. 3) may be governed from the clean-blowing control means 121 preventing the second control means 111 from deactivating the electromagnet 107 unless the inlet valve has closed. This governing may include that closing of the inlet valve 12 initiates deactivation of the electromagnet 107 for closing of the relief valve 100.

The clean-blowing control means 121 is preferably a part of a programmable logic controller that also includes the opening control means 110 and the second control means 111 of the relief valve 100.

Figure 13:
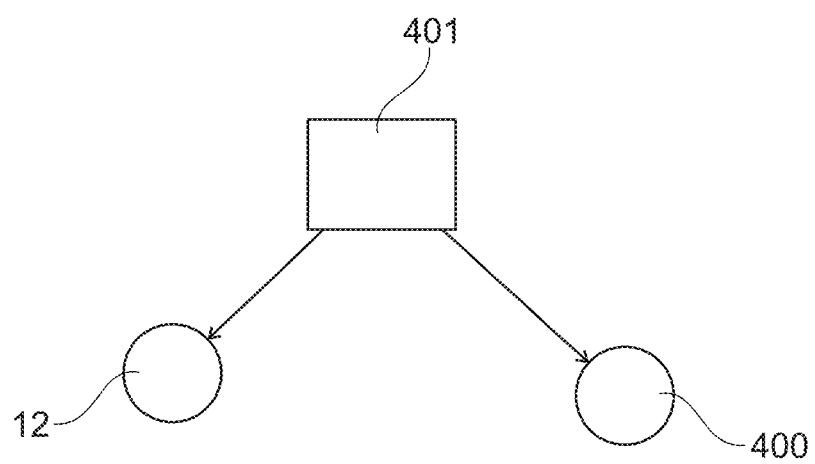
FIG. 13 is a block diagram illustrating governing of the valves according to a further example embodiment.

FIG. 13 illustrates governing of the inlet valve 12 and the relief valve 400 according to a further example embodiment. It is to be understood that the illustration of the valve governing may relate to a dust collector as illustrated in FIGS. 1 and 2. The relief valve 400 in this example may be of any suitable kind and may be pneumatically actuated. It may be without retaining means or may be provided with retaining means similar to that of the relief valve 100 described above. Both the relief valve 400 and the inlet valve 12 are governed by a central controller 401 with a PLC (programmable logic controller). The central controller governs the time intervals for the opening of the relief valve 400. It also governs the opening and closing of the relief valve 400 and the opening and closing of the inlet valve 12 as well as the timing of these actuations in relation to each other.

A typical example of the actuation of the valves and their timing-relation that may be programmed into the central controller 401 is that the relief valve 400 opens once every third minute. At opening of the relief valve 400, the time sequence below follows:

0 sec: The relief valve 300 opens
1 sec: The inlet valve 12 opens. At that moment substantially atmospheric pressure prevails in the dust collector.
1.3 sec: The inlet valve 12 closes
3 sec: The relief valve 300 closes.

The invention claimed is:

1. A dust collector comprising:
a cyclone; and
a hose device comprising a hose device body having a first end configured to be attached to the cyclone and a second end with a free opening, the hose device body being flexible;
a plurality of weights affixed to the hose device body;
wherein, when subjected to suction forces from a vacuum of the cyclone, the second end of the hose device body is sucked upwards such that the plurality of weights hingedly swing toward the first end of the hose device body, against gravity forces acting upon the weights, and the hose device body is in a retracted configuration;
wherein, when released from the suction forces of the cyclone, the plurality of weights hingedly swing away from the first end of the hose device body and the hose device body extends downwards into an extended configuration by the gravity forces acting upon the weights, in the absence of the suction forces, to expand a size of the free opening.

2. The dust collector of claim 1, wherein the weights are evening distributed around the hose device body.

3. The dust collector of claim 1, wherein each weight extends from proximate to the first end of the hose device body to proximate to the second end of the hose device body.

4. The dust collector of claim 1, wherein each weight comprises a pointed shape at an end of the weight proximate the second end of the hose device body.

5. The dust collector of claim 1, wherein the hose device body comprises a conical shape in the extended configuration.

6. The dust collector of claim 1, wherein the hose device body is mounted at a bottom of the cyclone and the hose device body hangs down from a first end disposed at the bottom of the cyclone.

7. The dust collector of claim 1 further comprising a dust bag affixed to the cyclone such that the hose device is disposed within the dust bag.

8. The dust collector of claim 1 further comprising a dust bag that hangs down from the cyclone.

9. The dust collector of claim 8, wherein, when the hose device body transitions to the extended configuration, accumulated dust within the hose device body falls down into the dust bag through the free opening.

10. The dust collector of claim 8, wherein, in the presence of the suction forces from the cyclone, the hose device prevents the dust bag from being sucking into the cyclone.

11. The dust collector of claim 1, wherein, in the presence of the suction forces from the cyclone, a portion of the hose device body moves inwards and upwards towards the cyclone.

12. The dust collector of claim 1, wherein, in the presences of the suction forces from the cyclone, each weight pivots upwards about an upper end of the weight.

13. The dust collector of claim 1
wherein the free opening permits air to pass through the hose device body while in the hose device body is in the retracted configuration.

14. The dust collector of claim 1, wherein the hose device comprises a rim with fasteners configured to engage with a bottom of the cyclone to secure the hose device body to the cyclone.

15. The dust collector of claim 1, wherein each weight has an oblong shape.

16. A hose device comprising:
a hose device body having a first end configured to be attached to a cyclone and a second end with a free opening, the hose device body being flexible;
a plurality of weights affixed between the first end and the second end;
wherein, when subjected to suction forces from a vacuum of the cyclone, the second end of the hose device body is sucked upwards such that the plurality of weights hingedly swing toward the first end of the hose device body and the hose device body is in a retracted configuration;
wherein, when released from the suction forces of the cyclone, the plurality of weights hingedly swing away from the first end of the hose device body and the hose device body extends downwards into an extended configuration by the gravity forces acting upon the weights, in the absence of the suction forces, to expand a size of the free opening.

17. The hose device of claim 16, wherein the weights are distributed around the hose device body between the first end and the second end.

18. The hose device of claim 16, wherein each weight comprises a pointed shape at an end of the weight proximate the second end of the hose device body.

\* \* \* \* \*